(12) United States Patent
Kim

(10) Patent No.: US 7,748,862 B2
(45) Date of Patent: Jul. 6, 2010

(54) LIQUID CRYSTAL DISPLAY APPARATUS

(75) Inventor: Hwan-Jin Kim, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 29 days.

(21) Appl. No.: 11/439,489

(22) Filed: May 18, 2006

(65) Prior Publication Data
US 2006/0285353 A1 Dec. 21, 2006

(30) Foreign Application Priority Data
Jun. 17, 2005 (KR) .................. 10-2005-0052417

(51) Int. Cl.
*G09F 13/04* (2006.01)
(52) U.S. Cl. ............ 362/97.2; 362/97.1; 362/615; 362/617; 362/623; 362/633; 349/58; 349/65; 349/149; 349/150; 349/151
(58) Field of Classification Search ........ 362/221, 362/238, 348, 349, 617, 623, 633, 615, 97.1–97.4; 349/65, 58, 149, 150, 151
See application file for complete search history.

(56) References Cited
U.S. PATENT DOCUMENTS
5,046,826 A * 9/1991 Iwamoto et al. ............ 349/65

| | | | |
|---|---|---|---|
| 7,213,958 B2 * | 5/2007 | Ouderkirk et al. | 362/609 |
| 2002/0145860 A1 * | 10/2002 | Lee | 362/26 |
| 2004/0037063 A1 * | 2/2004 | Chino | 362/31 |
| 2004/0109306 A1 * | 6/2004 | Lee | 362/31 |
| 2004/0141309 A1 * | 7/2004 | Ida | 362/31 |
| 2005/0041401 A1 * | 2/2005 | Chuang | 361/749 |

* cited by examiner

Primary Examiner—Sandra L O'Shea
Assistant Examiner—Mary Zettl
(74) Attorney, Agent, or Firm—Innovation Counsel LLP

(57) ABSTRACT

A liquid crystal display apparatus includes a light guide plate, a bottom chassis, a liquid crystal display panel disposed on the light guide plate to display an image, a flexible printed circuit board connected to the liquid crystal display panel and outwardly bent toward a rear surface of the bottom chassis to be fixed to the rear surface, and at least one point light source disposed at an adjacent position to an incident surface of the light guide plate. The light guide plate includes an inclined portion from a lower side of the light guide plate toward an upper side of the light guide plate. Advantageously, the liquid crystal display apparatus may prevent the occurrence of the step-difference between the point light source and the light guide plate, thereby improving light efficiency and brightness.

18 Claims, 5 Drawing Sheets

LIQUID CRYSTAL DISPLAY APPARATUS

CROSS REFERENCE TO RELATED APPLICATION

This application relies for priority upon Korean Patent Application No. 2005-52417 filed on Jun. 17, 2005, the contents of which are herein incorporated by reference in its entirety.

BACKGROUND OF THE INVENTION

1. Field of the Invention

The present invention relates to a liquid crystal display apparatus. More particularly, the present invention relates to a liquid crystal display apparatus having improved light efficiency.

2. Description of the Related Art

In general, mobile electronic instruments such as a mobile telecommunication device, a digital camera, an electrical calculating device, etc., employ a display apparatus to display an image. A liquid crystal display apparatus that displays the image using liquid crystal is widely applied as the display apparatus for the mobile electronic instrument since the liquid crystal display apparatus may be manufactured to have a small and plate-like shape. The liquid crystal display apparatus also has advantageous characteristics, such as lighter weight, lower power consumption, lower driving voltage, etc., in comparison with display apparatuses such as a cathode ray tube, a plasma display panel, etc.

The liquid crystal display apparatus typically requires a backlight assembly to apply light to the liquid crystal since a liquid crystal display panel of the liquid crystal display apparatus is not self-emissive. Specifically, a backlight assembly employed in a small to medium sized device, such as a mobile telecommunication device, may use light emitting diodes as a light source in consideration of product features of the backlight assembly. The backlight assembly needs a light guide plate to guide the light emitted from the light emitting diodes to the liquid crystal display panel.

In general, the light emitting diodes are coupled to a separate flexible printed circuit for driving the light emitting diodes, and then the light emitting diodes (coupled to the separate flexible printed circuit) are assembled with the liquid crystal display apparatus.

Recently, the light emitting diodes have been directly mounted on a main flexible printed circuit electrically connected to the liquid crystal display panel in lieu of employing the separate flexible printed circuit. Thus, the separate flexible printed circuit is removed from the liquid crystal display apparatus, and a soldering process of the separate flexible printed circuit to a main flexible printed circuit is also omitted.

However, the liquid crystal display apparatus typically has a step or width difference between the light emitting diodes and the light guide plate due to positions of the light emitting diodes. As a result, light may leak from the liquid crystal display apparatus and brightness of the liquid crystal display apparatus is deteriorated.

SUMMARY OF THE INVENTION

The present invention provides a liquid crystal display apparatus having improved light efficiency and brightness.

In one aspect of the present invention, a liquid crystal display apparatus includes a bottom chassis; a light guide plate disposed over the bottom chassis, the light guide plate including an incident surface and an inclined portion from a lower side of the light guide plate toward an upper side of the light guide plate as the inclined portion is spaced apart from the incident surface; a liquid crystal display panel disposed on the light guide plate to display an image; a flexible printed circuit board connected to the liquid crystal display panel and bent toward a rear surface of the bottom chassis such that the flexible printed circuit board is fixed to the rear surface of the bottom chassis; and at least one point light source electrically coupled to the flexible printed circuit board and disposed at an adjacent position to the incident surface of the light guide plate, wherein a light emitting surface of the point light source substantially corresponds to the incident surface of the light guide plate.

In another aspect of the present invention, a liquid crystal display apparatus includes the above and a mold frame having a rectangular shape with the light guide plate disposed inside the mold frame, the light guide plate further including an opposite surface facing the incident surface, an exiting surface extended in a direction substantially perpendicular to the incident surface from an upper end of the incident surface and connected to an upper end of the opposite surface, and a reflecting surface extended from a lower end of the incident surface and connected to a lower end of the opposite surface. A bottom chassis is coupled to the mold frame to cover a lower portion of the light guide plate and further includes an opening to receive a light emitting diode and the inclined portion of the light guide plate.

Advantageously, the liquid crystal display apparatus may prevent occurrence of the step-difference between the light emitting diode and the light guide plate since the inclined portion is formed at the reflecting surface of the light guide plate. Thus, the liquid crystal display apparatus may prevent the leakage of the light and deterioration of the light brightness, thereby improving the light efficiency.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The above and other advantages of the present invention will become readily apparent by reference to the following detailed description when considered in conjunction with the accompanying drawings wherein.

Embodiments of the present invention and their advantages are best understood by referring to the detailed description that follows. It should be appreciated that like reference numerals are used to identify like elements illustrated in one or more of the figures. It should also be appreciated that the figures may not be necessarily drawn to scale.

DETAILED DESCRIPTION

Hereinafter, the present invention will be explained in detail with reference to the accompanying drawings.

Figure 1:
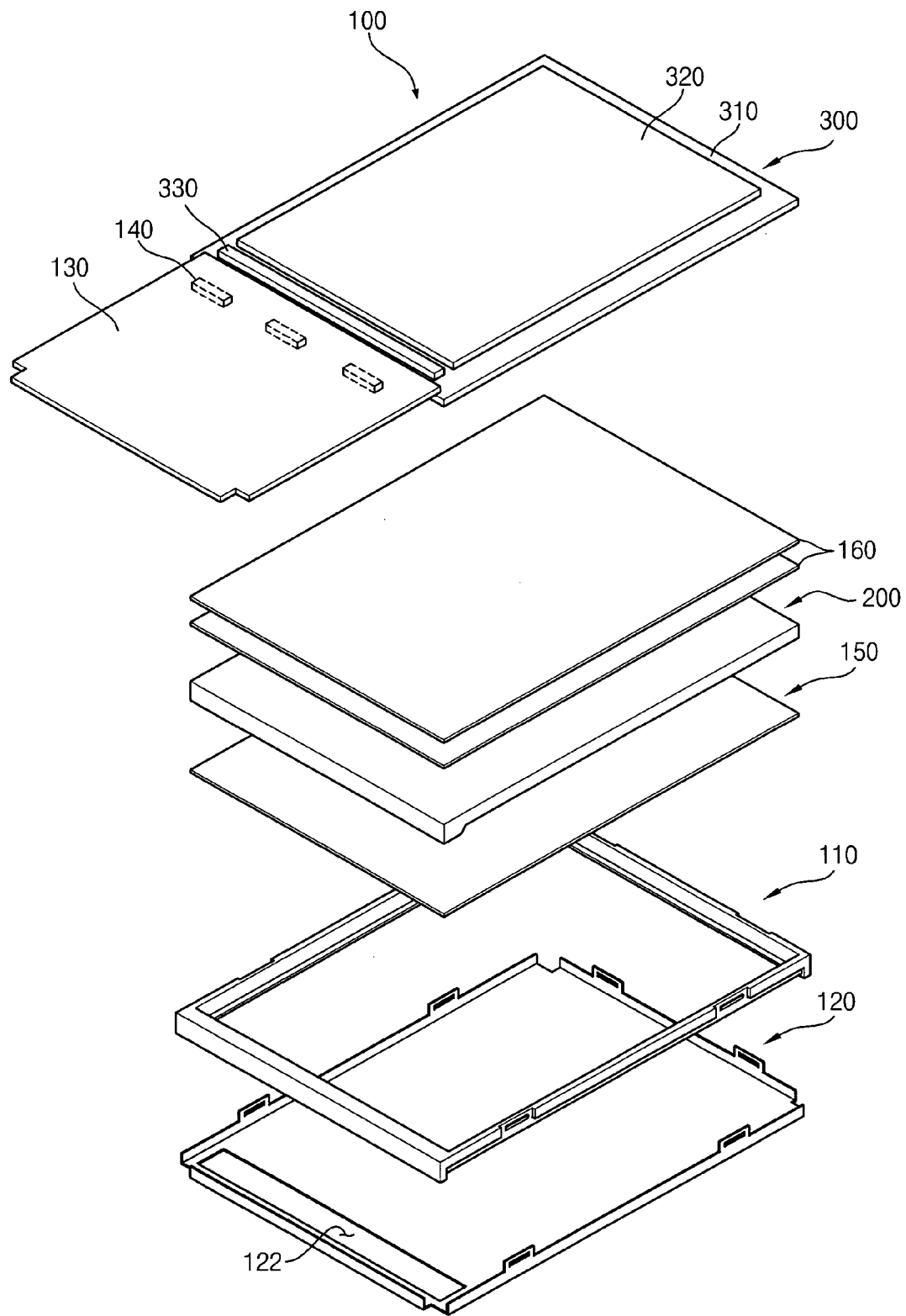
FIG. 1 is an exploded perspective view showing a liquid crystal display apparatus according to an embodiment of the present invention.
Figure 2:
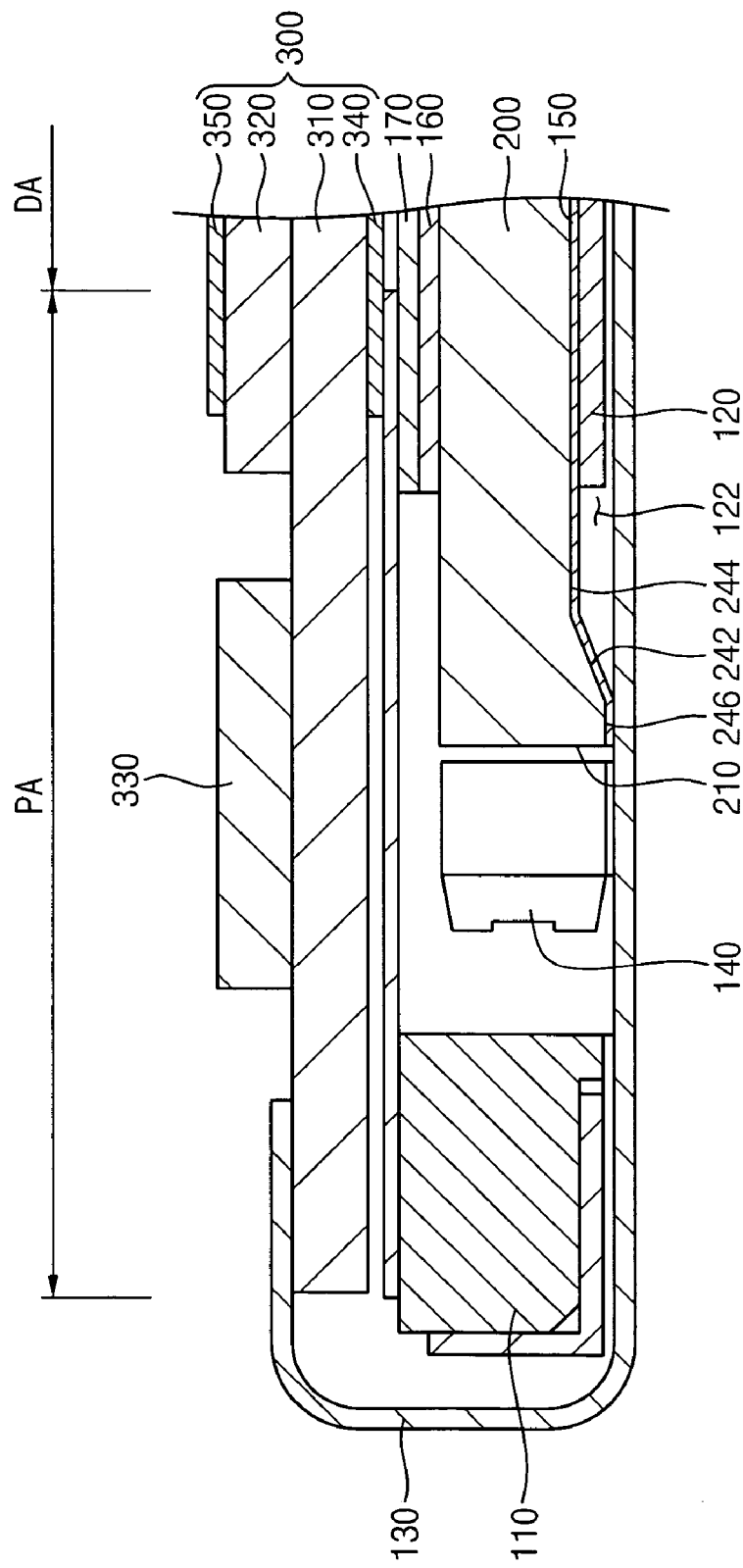
FIG. 2 is an assembled cross-sectional view of the liquid crystal display apparatus in FIG. 1.

FIG. 1 is an exploded perspective view showing a liquid crystal display apparatus according to an embodiment of the present invention. FIG. 2 is an assembled cross-sectional view showing the liquid crystal display apparatus in FIG. 1. Referring to FIGS. 1 and 2, a liquid crystal display apparatus 100 according to an embodiment of the present invention includes a mold frame 110, a light guide plate 200, a bottom chassis 120, a liquid crystal display panel 300, a flexible printed circuit board 130, and a point light source 140.

The mold frame 110 has a frame or rectangular shape and includes a plastic material.

The light guide plate 200 is disposed inside the mold frame 110. The light guide plate 200 guides light emitted from the point light source 140 toward the liquid crystal display panel 300. The light guide plate 200 includes a transparent material to minimize a loss of light from the point light source 140. For example, the light guide plate 200 includes a material having superior strength, such as polymethylmethacrylate (PMMA). In order to reduce a thickness of the light guide plate 200, the light guide plate 200 may include polycarbonate (PC). The polycarbonate is inferior in strength to the polymethylmethacrylate, but the polycarbonate is superior in heat-resistance to the polymethylmethacrylate. The light guide plate 200 may also include a reflection pattern (not shown) formed on a lower surface of the light guide plate 200 to diffusely reflect the light from the point light source 140. The reflection pattern may include a printed pattern or a concavo-convex pattern. The light incident on the light guide plate 200 from the point light source 140 is diffusively reflected by the reflection pattern, and the light exceeding a critical angle passes through and exits an upper surface of the light guide plate 200 towards the liquid crystal display panel 300.

The bottom chassis 120 is coupled to the mold frame 110 to cover a lower portion of the light guide plate 200. The bottom chassis 120 may include a metal material having a superior strength to the mold frame 110, and may be coupled to the mold frame 110 in a hook-type manner. The bottom chassis 120 includes an opening 122 through which the point light source 140 is received.

The liquid crystal display panel 300 is disposed on the light guide plate 200 and displays an image using the light exiting from the light guide plate 200. The liquid crystal display panel 300 includes a lower substrate 310 to which the flexible printed circuit board 130 is connected, an upper substrate 320 facing the lower substrate 310, a liquid crystal layer (not shown) disposed between the lower substrate 310 and the upper substrate 320, and a driving chip 330 coupled to the lower substrate 310. The driving chip 330 outputs a driving signal to drive the liquid crystal display panel 300 in response to a control signal applied through the flexible printed circuit board 130. The liquid crystal display panel 300 further includes a first polarization film 340 attached to an outer surface of the lower substrate 310 and a second polarization film 350 attached to an outer surface of the upper substrate 320. The first polarization film 340, for example, has a polarization axis intersecting a polarization axis of the second polarization film 350.

The flexible printed circuit board 130 is coupled to an end portion of the lower substrate 310 on which the driving chip 330 is mounted. The flexible printed circuit board 130 is electrically connected with the lower substrate 310 by, for example, an anisotropic conductive film (ACF). Although not shown in FIGS. 1 and 2, various electronic parts such as a capacitor, a resistor, etc., may be mounted on the flexible printed circuit board 130 to generate and stabilize the control signal. The flexible printed circuit board 130 has a flexible characteristic, so that the flexible printed circuit board 130 may be outwardly bent toward a rear surface of the bottom chassis 120 and fixed to the rear surface of the bottom chassis 120 (see FIG. 2). In one example, the flexible printed circuit board 130 is fixed to the rear surface of the bottom chassis 120 using a reversible tape.

The point light source 140 is electrically connected to the flexible printed circuit board 130. The point light source 140 may include a light emitting diode (LED) emitting a white light. As shown in FIG. 1, the liquid crystal display apparatus 100 may include a plurality of point light sources. The number of point light sources is determined in one example by considering the size and desired brightness of the liquid crystal display panel 300.

The point light source 140 is disposed at an adjacent position to an incident surface 210 of the light guide plate 200 due to a bending of the flexible printed circuit board 130. That is, the point light source 140 is disposed at the adjacent position to the incident surface 210 after passing through the opening 122 of the bottom chassis 120 when the flexible printed circuit board 130 is bent. When the point light source 140 attached to the flexible printed circuit board 130 is disposed at the adjacent position to the incident surface 210, a step-difference or lack of coverage/alignment between the point light source 140 and the light guide plate 200 may occur due to the bending of the flexible printed circuit board 130. In accordance with the present invention, the light guide plate 200 includes an inclined portion 242 such that the incident surface 210 of the light guide plate 200 substantially corresponds to an emitting surface of the point light source 140, thereby reducing a step-difference between the point light source 140 and the light guide plate 200. That is, a thickness of the light guide plate 200 corresponding to the inclined portion decreases as the inclined portion is spaced apart or moves away from the incident surface 210 of the light guide plate 200.

Figure 3:
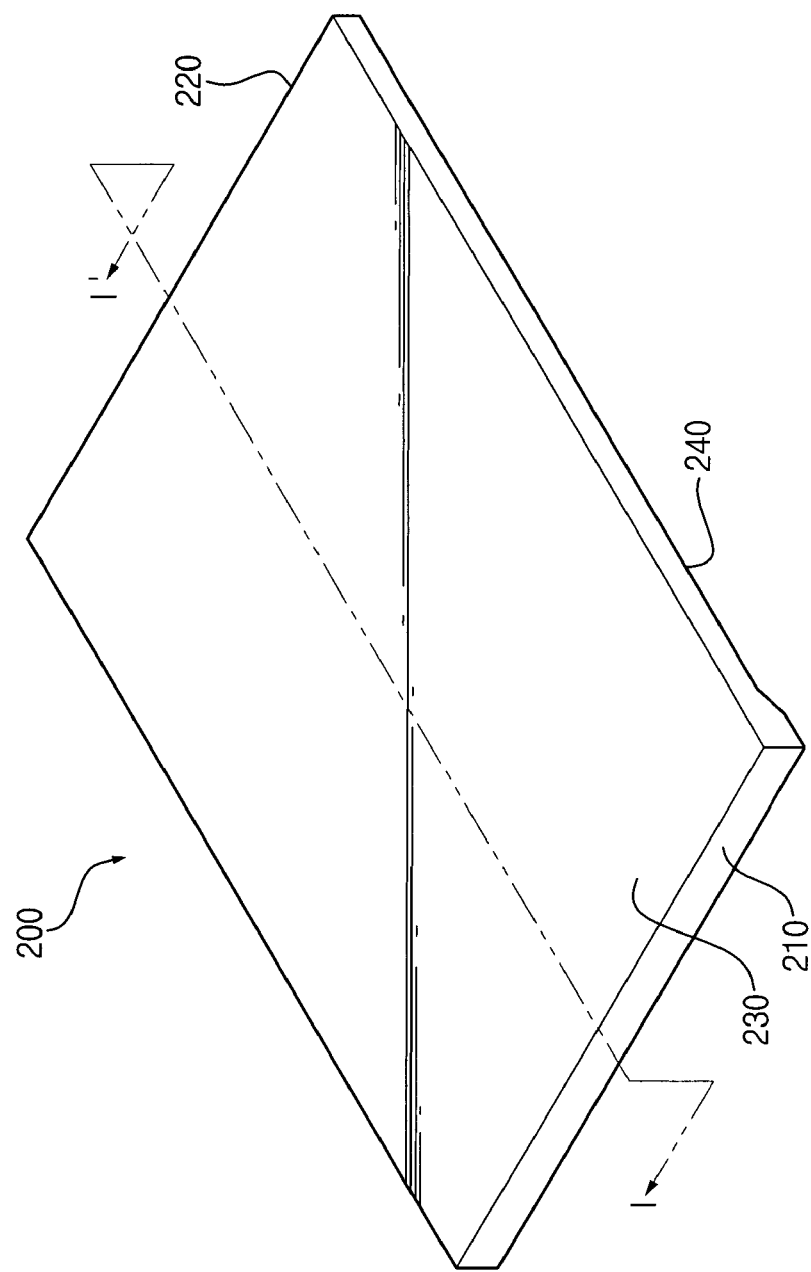
FIG. 3 is a perspective view showing the light guide plate in FIG. 1.
Figure 4:
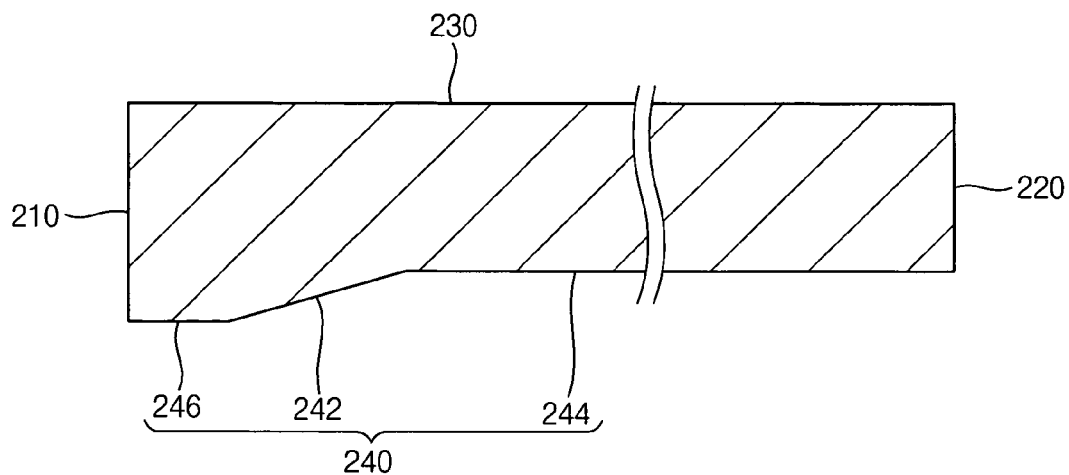
FIG. 4 is a cross-sectional view taken along a line I-I' in FIG. 3.

FIG. 3 is a perspective view showing the light guide plate in FIG. 1. FIG. 4 is a cross-sectional view taken along a line I-I' in FIG. 3. Referring to FIGS. 3 and 4, the light guide plate 200 includes the incident surface 210, an opposite surface 220 facing the incident surface 210, an exiting surface 230 extended in a direction substantially perpendicular to the incident surface 210 from an upper end of the incident surface and connected to an upper end of the opposite surface 220, and a reflecting surface 240 extended from a lower end of the incident surface 210 and connected to a lower surface of the opposite surface 220.

The reflecting surface 240 includes the inclined portion 242, which is inclined from the reflecting surface toward the exiting surface 230 at a predetermined angle. The inclined portion 242 formed with the reflecting surface 240 is formed substantially at the adjacent position to the incident surface 210 of the light guide plate 200.

The reflecting surface 240 includes a first reflecting portion 244. The first reflecting portion 244 is extended from the lower end of the opposite surface 220 and connected to an upper end of the inclined portion 242. The first reflecting portion 244 is substantially in parallel with the exiting surface 230.

Further, the reflecting surface 240 includes a second reflecting portion 246. The second reflecting portion 246 is extended from the lower end of the incident surface 210 and connected to a lower surface of the inclined portion 242. The second reflecting portion 246 is also substantially in parallel with the exiting surface 230 but at a lower plane than first reflecting portion 244.

The thickness of light guide plate 200 between the exiting surface 230 and the second reflecting portion 246 is greater than the thickness of light guide plate 200 between the exiting surface 230 and the first reflecting portion 244. Thus, the incident surface 210 of the light guide plate 200 has a thickness greater than a thickness of the opposite surface 220 and corresponds to the emitting surface of the point light source.

Referring to FIG. 2, the bottom chassis 120 is partially opened to form the opening 122 through which the point light source 140 and the inclined portion 242 are received.

The point light source 140 attached to the flexible printed circuit board 130 is disposed inside the mold frame 110 through the opening 122 of the bottom chassis 120. The inclined portion 242 and the second reflecting portion 246 of the light guide plate 200 are disposed substantially at an adjacent position to the flexible printed circuit board 130 through the opening 122.

Thus, the emitting surface of the point light source 140 has a size corresponding to a size of the incident surface 210 of the light guide plate 200, thereby substantially preventing the step-difference between the point light source 140 and the light guide plate 200.

The liquid crystal display panel 300 includes a display area DA on which the image is displayed and a peripheral area PA surrounding the display area DA. The inclined portion 242 of the light guide plate 200 is formed in an area corresponding to the peripheral area PA to prevent deterioration of display quality of the image.

Referring to FIGS. 1 and 2, the liquid crystal display apparatus 100 further includes a reflecting sheet 150 disposed under the reflecting surface 240 of the light guide plate 200. The reflecting sheet 150 covers the reflecting surface 240 including the inclined portion 242. In one embodiment, the reflecting sheet 150 is attached to the reflecting surface 240 of the light guide plate 200. The reflecting sheet 150 reflects the light leaked through the reflecting surface 240 of the light guide plate 200 back to the light guide plate 200, so that light efficiency is enhanced. In one example, the reflecting sheet 150 includes a high-reflectivity material such as polyethyleneterephthalate (PET) or polycarbonate (PC) in white color.

The liquid crystal display apparatus 100 further includes at least one optical sheet 160 disposed on the exiting surface 230. The optical sheet 160 improves the brightness characteristic of the light exiting from the light guide plate 200 and may be comprised of various types of material. In one example, the optical sheet 160 may include a diffusion sheet for diffusing the light exiting from the light guide plate 200 to improve brightness uniformity of the light. In another example, the optical sheet 160 may include a prism sheet. The prism sheet condenses the light exiting from the light guide plate 200 to improve front brightness of the light. In yet another example, the optical sheet 160 may include a reflective polarizing sheet recycling the light to enhance the brightness of the light exiting from the light guide plate 200. The reflective polarizing sheet partially transmits the light exiting from the light guide plate 200 and partially reflects the light exiting from the light guide plate 200. The liquid crystal display apparatus 100 may further include various optical sheets according to the brightness characteristic required of the liquid crystal display apparatus 100.

The optical sheet 160 disposed on the light guide plate 200 is fixed to the mold frame 110 by a black-colored adhesive tape 170 in one example. In addition, the liquid crystal display panel 300 disposed on the optical sheet 160 may be fixed to the mold frame 110 by the black-colored adhesive tape 170. Other adhesive means and methods are within the scope of the present invention. The adhesive tape 170 is adhered to the liquid crystal display panel 300 corresponding to the peripheral area PA. The adhesive tape 170 may prevent leakage of the light from the point light source 140 and the incident surface 210 of the light guide plate 200 since the adhesive tape 170 has a black color.

Figure 5:
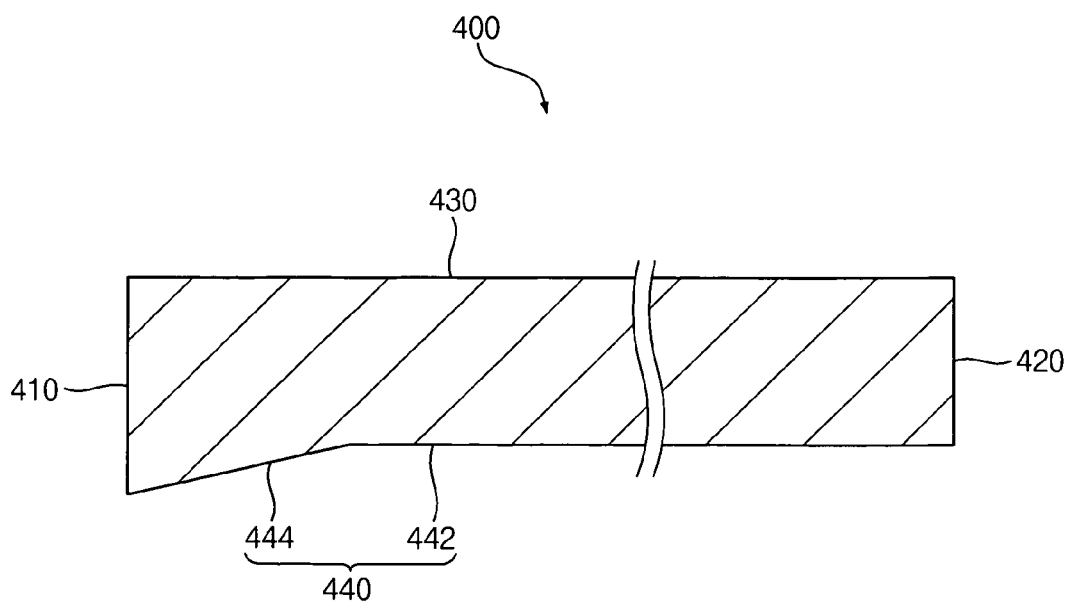
FIG. 5 is a cross-sectional view showing a light guide plate according to another embodiment of the present invention.

FIG. 5 is a cross-section view showing a light guide plate according to another embodiment of the present invention. Referring to FIG. 5, a light guide plate 400 according to another embodiment of the present invention includes an incident surface 410, an opposite surface 420 facing the incident surface 410, an exiting surface 430 extended from an upper end of the incident surface 410 and connected to an upper end of the opposite surface 420, and a reflecting surface 440 extended from a lower end of the incident surface 410 and connected to a lower surface of the opposite surface 420. The exiting surface 430 is substantially perpendicular to the incident surface 410 and the opposite surface 420.

The reflecting surface 440 includes a reflecting portion 442 and an inclined portion 444. The reflecting portion 442 is extended from the lower end of the opposite surface 420 and connected to an upper end of the inclined portion 444. A lower end of the inclined portion 444 is connected to the lower end of the incident surface 410, so that the inclined portion 444 is inclined from the lower end of the incident surface 410 toward reflecting portion 442. Thus, the light guide plate 400 has a thickness greater at the incident surface 410 than at the opposite surface 420 such that the incident surface 410 corresponds to the emitting surface of the point light source.

Figure 6:
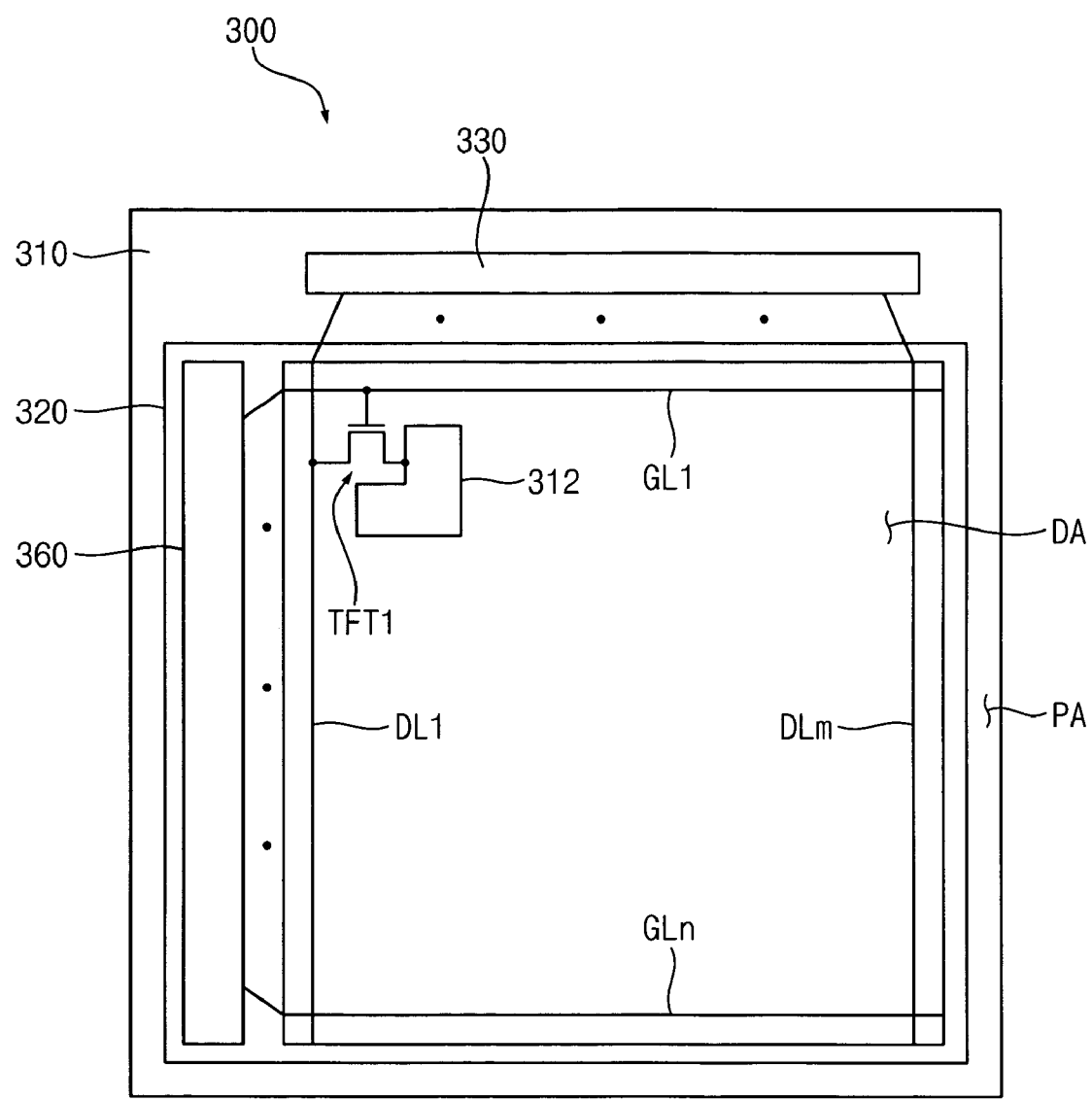
FIG. 6 is a plan view showing the liquid crystal display panel in FIG. 1.

FIG. 6 is a plan view showing the liquid crystal display panel in FIG. 1. Referring to FIG. 6, the liquid crystal display panel 300 includes the lower substrate 310, the upper substrate 320 facing the lower substrate 310, the liquid crystal layer (not shown) disposed between the lower substrate 310 and the upper substrate 320, and the driving chip 330 coupled to the lower substrate 310.

The liquid crystal display panel 300 includes the display area DA on which the image is displayed and the peripheral area PA surrounding the display area DA.

A plurality of gate lines GL1~ GLn and a plurality of data lines DL1~ DLm intersecting with the gate lines GL1~ GLn are formed on the lower substrate 310 corresponding to the display area DA (wherein "n" and "m" are each a natural number more than "1"). The gate lines GL1~GLn are formed on a layer different from a layer on which the data lines DL1~DLm are formed, so that the gate lines GL1~GLn are insulated from and intersect with the data lines DL1~DLm.

A plurality of thin film transistors and a plurality of pixel electrodes are formed on the lower substrate 310 in a matrix. The thin film transistors and the pixel electrodes are formed in an area corresponding to the display area DA. Particularly, a first thin film transistor TFT1 includes a gate electrode electrically connected to a first gate line GL1 of the gate lines GL1~GLn, a source electrode electrically connected to a first data line DL1 of the data lines DL1~DLm, and a drain electrode electrically connected to a first pixel electrode 312.

A gate driving circuit part 360 may further be formed on the lower substrate 310 corresponding to the peripheral area PA to drive the gate lines GL1~GLn. The gate driving circuit part 360 includes a shift register having a plurality of driving transistors.

The gate driving circuit part 360 sequentially outputs a gate driving signal to the gate lines GL1~GLn in response to a gate control signal applied through the flexible printed circuit board 130 (FIGS. 1 and 2).

The gate driving circuit part 360 is substantially and simultaneously formed with the gate lines GL1~GLn, the data lines DL1~DLm, and the thin film transistors by a thin film process.

The upper substrate 320 includes a color filter layer (not shown) for expressing colors and a common electrode (not shown) facing the pixel electrode of the upper substrate 310. Alternatively, the color filter layer may be formed on the lower substrate 310.

The liquid crystal layer disposed between the lower substrate 310 and the upper substrate 320 includes liquid crystal molecules having electrical and optical properties such as an anisotropic dielectric constant, an anisotropic reflectance, etc. In one example, the liquid crystal layer includes twisted nematic liquid crystal molecules that are twisted at a predetermined angle in response to an electric field applied to the pixel electrode and the common electrode.

The driving chip 330 is mounted in the peripheral area PA of the lower substrate 310. The driving chip 330 is electrically connected to the lower substrate 310 by the anisotropic conductive film (ACF) in one example. The driving chip 330 outputs a data driving signal to the data lines DL1~DLm in response to the control signal applied through the flexible printed circuit board 130.

When a power voltage is applied to the gate of the thin film transistor that in turn switches on the thin film transistor, the electric field is formed between the pixel electrode and the common electrode. The electric field varies an aligning angle of the liquid crystal molecules of the liquid crystal layer disposed between the lower substrate 310 and the upper substrate 320. Thus, a light transmittance of the liquid crystal layer is varied in accordance with the variation of the aligning angle of the liquid crystal, so a desired image may be obtained.

Although not shown in the figures, the liquid crystal display apparatus 100 may further include a top chassis for fixing a printed circuit board on which parts, such as a timing controller processing a source image signal applied from an exterior and a memory, are mounted and for fixing the liquid crystal display panel 300 to the mold frame 110 and the bottom chassis 120.

In accordance with the present invention, the light emitting diode of a liquid crystal display apparatus is mounted on the main flexible printed circuit board connected to the liquid crystal display panel. Thus, the separate flexible printed circuit board for the light source may be removed from the liquid crystal display panel, and the process for soldering the separate flexible printed circuit board for the light source to the main flexible printed circuit board may be omitted, so that a manufacturing cost of the liquid crystal display apparatus may be reduced.

Further, the liquid crystal display apparatus may prevent occurrence of the step-difference between the light emitting diode and the light guide plate with the use of an inclined portion formed at the reflecting surface of the light guide plate. Thus, the liquid crystal display apparatus may prevent leakage of the light and deterioration of the display brightness, thereby improving the light efficiency.

Although the embodiments of the present invention have been described, it is understood that the present invention should not be limited to these embodiments but various changes and modifications can be made by one of ordinary skill in the art within the spirit and scope of the present invention as hereinafter claimed.

What is claimed is:

1. A liquid crystal display apparatus, comprising:
a bottom chassis having an opening;
a unitary light guide plate disposed over the bottom chassis, the light guide plate including an incident surface and an inclined portion from a lower side of the light guide plate toward an upper side of the light guide plate;
a liquid crystal display panel disposed over the light guide plate to display an image;
a flexible printed circuit board connected to the liquid crystal display panel and bent toward a rear surface of the bottom chassis such that the flexible printed circuit board is fixed to the rear surface of the bottom chassis; and
at least one point light source electrically coupled to the flexible printed circuit board and disposed at an adjacent position to the incident surface of the light guide plate, wherein a light emitting surface of the point light source substantially corresponds to the incident surface of the light guide plate,
wherein the inclined portion is formed at an adjacent position to the incident surface,
wherein the liquid crystal display panel comprises a display area on which the image is displayed and a peripheral area surrounding the display area, and the inclined portion is disposed in the peripheral area, and
wherein the at least one point light source passes through the opening of the bottom chassis and at least a portion of the inclined portion is inserted into the opening of the bottom chassis.

2. The liquid crystal display apparatus of claim 1, wherein the light guide plate comprises:
an opposite surface facing the incident surface;
an exiting surface extended in a direction substantially perpendicular to the incident surface from an upper end of the incident surface and connected to an upper end of the opposite surface; and
a reflecting surface extended from a lower end of the incident surface and connected to a lower end of the opposite surface, the inclined portion being formed at the reflecting surface.

3. The liquid crystal display apparatus of claim 2, wherein the incident surface has a thickness greater than a thickness of the opposite surface.

4. The liquid crystal display apparatus of claim 2, wherein the reflecting surface comprises a first reflecting portion extended from the lower end of the opposite surface and connected to an upper end of the inclined portion, and further wherein the first reflecting portion is substantially parallel to the exiting surface.

5. The liquid crystal display apparatus of claim 4, wherein the reflecting surface comprises a second reflecting portion extended from the lower end of the incident surface and connected to a lower end of the inclined portion, and further wherein the second reflecting portion is substantially parallel to the exiting portion.

6. The liquid crystal display apparatus of claim 4, wherein the lower end of the inclined portion is directly connected to the lower end of the incident surface.

7. The liquid crystal display apparatus of claim 1, wherein the liquid crystal display panel comprises:
a lower substrate connected to the flexible printed circuit board;
an upper substrate facing the lower substrate;

a liquid crystal layer disposed between the lower substrate and the upper substrate; and a driving chip connected to the lower substrate.

8. The liquid crystal display apparatus of claim 7, wherein the liquid crystal display panel comprises a gate driving circuit formed on the lower substrate to drive a gate line.

9. The liquid crystal display apparatus of claim 1, wherein the point light source comprises a light emitting diode emitting a white light.

10. The liquid crystal display apparatus of claim 1, further comprising a reflecting sheet disposed under the light guide plate to reflect a light leaked from the light guide plate.

11. The liquid crystal display apparatus of claim 1, further comprising at least one optical sheet disposed on the light guide plate to improve brightness characteristic of a light exiting from the light guide plate.

12. The liquid crystal display apparatus of claim 1, further comprising a mold frame having a rectangular shape, wherein the light guide plate is disposed inside of the mold frame and the bottom chassis is coupled to the mold frame.

13. The liquid crystal display apparatus of claim 1, wherein the inclined portion prevents a step-difference between the point light source and the light guide plate, so that a whole of the light emitting surface of the point light source faces the incident surface of the unitary guide plate.

14. A liquid crystal display apparatus, comprising:

a mold frame having a rectangular shape;

a unitary light guide plate disposed inside the mold frame, the light guide plate including an incident surface, an inclined portion from a lower side of the light guide plate toward an upper side of the light guide plate, an opposite surface facing the incident surface, an exiting surface extended in a direction substantially perpendicular to the incident surface from an upper end of the incident surface and connected to an upper end of the opposite surface, and a reflecting surface extended from a lower end of the incident surface and connected to a lower end of the opposite surface;

a bottom chassis coupled to the mold frame to cover a lower portion of the light guide plate, the bottom chassis having an opening;

a liquid crystal display panel disposed over the light guide plate to display an image;

a flexible printed circuit board connected to the liquid crystal display panel and bent toward a rear surface of the bottom chassis such that the flexible printed circuit board is fixed to the rear surface of the bottom chassis; and at least one light emitting diode electrically coupled to the flexible printed circuit board and disposed at an adjacent position to the incident surface of the light guide plate to emit a light, wherein a light emitting surface of the at least one light emitting diode substantially corresponds to the incident surface of the light guide plate, and further wherein the bottom chassis includes an opening to receive the light emitting diode and the inclined portion of the light guide plate, wherein the inclined portion is formed at an adjacent position to the incident surface, wherein the liquid crystal display panel comprises a display area on which the image is displayed and a peripheral area surrounding the display area, and the inclined portion is disposed in the peripheral area, and wherein the at least one light emitting diode passes through the opening of the bottom chassis and at least a portion of the inclined portion is inserted into the opening of the bottom chassis.

15. The liquid crystal display apparatus of claim 14, wherein the reflecting surface comprises:

a first reflecting portion extended from the lower end of the opposite surface and connected to an upper end of the inclined portion; and a second reflecting portion extended from the lower end of the incident surface and connected to a lower end of the inclined portion, wherein the first reflecting portion and the second reflecting portion are substantially parallel with the exiting surface.

16. The liquid crystal display apparatus of claim 14, wherein the reflecting surface comprises a first reflecting portion extended from the lower end of the opposite surface and connected to an upper end of the inclined portion, and further wherein the first reflecting portion is substantially parallel to the exiting surface.

17. The liquid crystal display apparatus of claim 16, wherein the reflecting surface comprises a second reflecting portion extended from the lower end of the incident surface and connected to a lower end of the inclined portion, and further wherein the second reflecting portion is substantially parallel to the exiting portion.

18. The liquid crystal display apparatus of claim 16, wherein the lower end of the inclined portion is directly connected to the lower end of the incident surface.

* * * * *